(12) United States Patent
Omanovic et al.

(10) Patent No.: US 11,391,946 B2
(45) Date of Patent: Jul. 19, 2022

(54) ADJUSTABLE POLARIZER FOR HEAD UP DISPLAYS

(71) Applicant: Panasonic Automotive Systems Company of America, Division of Panasonic Corporation of North America, Peachtree City, GA (US)

(72) Inventors: Edo Omanovic, Livonia, MI (US); Patrick O'Connell, Novi, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 409 days.

(21) Appl. No.: 16/502,865

(22) Filed: Jul. 3, 2019

(65) Prior Publication Data
US 2020/0012102 A1    Jan. 9, 2020

Related U.S. Application Data

(60) Provisional application No. 62/694,335, filed on Jul. 5, 2018.

(51) Int. Cl.
*G02B 27/01* (2006.01)
*G02B 27/28* (2006.01)
*B60K 35/00* (2006.01)

(52) U.S. Cl.
CPC ....... *G02B 27/0101* (2013.01); *G02B 27/281* (2013.01); *B60K 35/00* (2013.01); *B60K 2370/1529* (2019.05); *B60K 2370/25* (2019.05); *B60K 2370/52* (2019.05); *B60K 2370/736* (2019.05)

(58) Field of Classification Search
CPC .............. G02B 27/0101; G02B 27/281; B60K 2370/1529; B60K 2370/736; B60K 2370/52; B60K 2370/25; B60K 35/00
See application file for complete search history.

(56) References Cited

U.S. PATENT DOCUMENTS

| | | | |
|---|---|---|---|
| 2007/0217010 A1* | 9/2007 | Lippey | G02B 27/0101 359/488.01 |
| 2009/0153962 A1* | 6/2009 | Okada | G02B 27/0101 359/485.02 |
| 2013/0050593 A1* | 2/2013 | Fujikawa | G02B 27/0101 349/9 |
| 2015/0355461 A1* | 12/2015 | Kessler | G02B 27/0101 359/631 |

(Continued)

*Primary Examiner* — William R Alexander
*Assistant Examiner* — Sharrief I Broome
(74) *Attorney, Agent, or Firm* — Laurence S. Roach, Esq.

(57) ABSTRACT

A head up display arrangement for a motor vehicle includes a head up display module having a picture generation unit emitting a light field. A polarizing device is rotatable between at least a first rotational position and a second rotational position. The polarizing device receives the light field from the picture generation unit and emits the light field regardless of whether the polarizing device is in the first rotational position or the second rotational position. More of the light is emitted by the polarizer in a P-polarization state in the second rotational position than in the first rotational position. A windshield reflects the light field from the polarizing device such that the reflected light field is visible to a human driver of the motor vehicle as a virtual image.

20 Claims, 3 Drawing Sheets

(56) References Cited

U.S. PATENT DOCUMENTS

| | | | |
|---|---|---|---|
| 2016/0147062 A1* | 5/2016 | Yamakawa | H04N 3/08 348/203 |
| 2017/0357088 A1* | 12/2017 | Matsuzaki | G02B 6/3516 |
| 2017/0361687 A1* | 12/2017 | Chen | G02B 27/0101 |
| 2017/0363863 A1* | 12/2017 | Chen | G02B 5/3083 |
| 2018/0101009 A1* | 4/2018 | Lambert | G02B 27/28 |

* cited by examiner

ADJUSTABLE POLARIZER FOR HEAD UP DISPLAYS

CROSS-REFERENCED TO RELATED APPLICATIONS

This application claims benefit of U.S. Provisional Application No. 62/694,335 filed on Jul. 5, 2018, the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Many current owners of HUD-equipped vehicles have expressed unhappiness with inability to view the HUD image while wearing polarized sunglasses. The following methods are known to enable the image of a windshield HUD to be viewed with polarized sunglasses: (1) The HUD projector emits circularly polarized or elliptically polarized light. This is not a fully satisfactory solution since the windshield reflectivity to p-polarized light is small; (2) The driver can wear non-polarizing sunglasses; (3) A plastic lens, including a wave plate, can be clipped over the polarizing sunglasses; and (4) An interior surface of the windshield can be coated with a reflective layer. Doing so increases windshield reflectance, and, as a result, increases veiling glare.

Currently, virtual images produced by head up displays become extremely dim when the user is wearing polarized sun glasses. In some instances, the virtual image completely disappears because the light coming towards the driver has a majority of its light in one polarization state.

There is no known solution to the problem of a dim virtual image. A driver wearing polarized sunglasses cannot see the virtual image produced by the HUD on a sunny day.

Circularly polarizing the light after the picture generation unit (PGU) may help slightly, but it does not solve the problem.

SUMMARY

The present invention may provide a head up display (HUD) system that reflects light from the front windshield of a vehicle to be seen by the driver as a virtual image. In one embodiment, the system includes an additional optical element which enables the driver to see the virtual image when he is wearing polarized sun glasses. A rotatable polarizing device may be disposed in front of the liquid crystal display (LCD), and may rotate over an angular distance which results in the light shifting to either P-polarized light or S-polarized light. The driver may depress a "Polarized Sunglasses" button which causes the polarizing device to rotate, and the image may thus become brighter through polarized sunglasses. The rotation of the polarizing device may enable the light to pass through the polarized sunglasses, making the image much brighter and visible to the user.

In one embodiment, the invention comprises a head up display arrangement for a motor vehicle, including a head up display module having a picture generation unit emitting a light field. A polarizing device is rotatable between at least a first rotational position and a second rotational position. The polarizing device receives the light field from the picture generation unit and emits the light field regardless of whether the polarizing device is in the first rotational position or the second rotational position. More of the light is emitted by the polarizing device in a P-polarization state in the second rotational position than in the first rotational position. A windshield reflects the light field from the polarizing device such that the reflected light field is visible to a human driver of the motor vehicle as a virtual image.

In another embodiment, the invention comprises a head up display method, including providing a head up display module including a picture generation unit and a polarizing device. Light is emitted by use of the picture generation unit. Light from the picture generation unit is passed through the polarizing device while the polarizing device is in a first rotational position. A first fraction of the light is in a P-polarization state after passing through the polarizing device in the first rotational position. The polarizing device is rotated from the first rotational position to a second rotational position. Light from the picture generation unit is passed through the polarizing device while the polarizing device is in a second rotational position. A second fraction of the light is in a P-polarization state after passing through the polarizing device in the second rotational position. The second fraction is greater than the first fraction. Light that has passed through the polarizing device is reflected off of a windshield such that the reflected light field is visible to a human driver of a motor vehicle as a virtual image.

In yet another embodiment, the invention comprises a head up display arrangement for a motor vehicle, including a user interface and a head up display module having a picture generation unit emitting a light field. A polarizing device is rotatable between at least a first rotational position and a second rotational position. The polarizing device passes the light field from the picture generation unit in both the first rotational position and the second rotational position. A greater percentage of the light is passed by the polarizing device in a P-polarization state in the second rotational position than in the first rotational position. At least one movable mirror reflects the light field from the polarizing device. A motor is selectively couplable to the polarizing device and to the at least one movable mirror such that the motor may rotate the polarizing device and move the at least one movable mirror. An electronic processor is communicatively coupled to the user interface and to the motor. The electronic processor responds to a first signal from the user interface by causing the motor to move the at least one movable mirror. The electronic processor responds to a second signal from the user interface by causing the motor to rotate the polarizing device. A windshield reflects the light field from the at least one movable mirror such that the reflected light field is visible to a human driver of the motor vehicle as a virtual image.

An advantage of the present invention is that it solves the problem of the driver not being able to see the HUD virtual image while wearing ordinary polarizing sunglasses.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
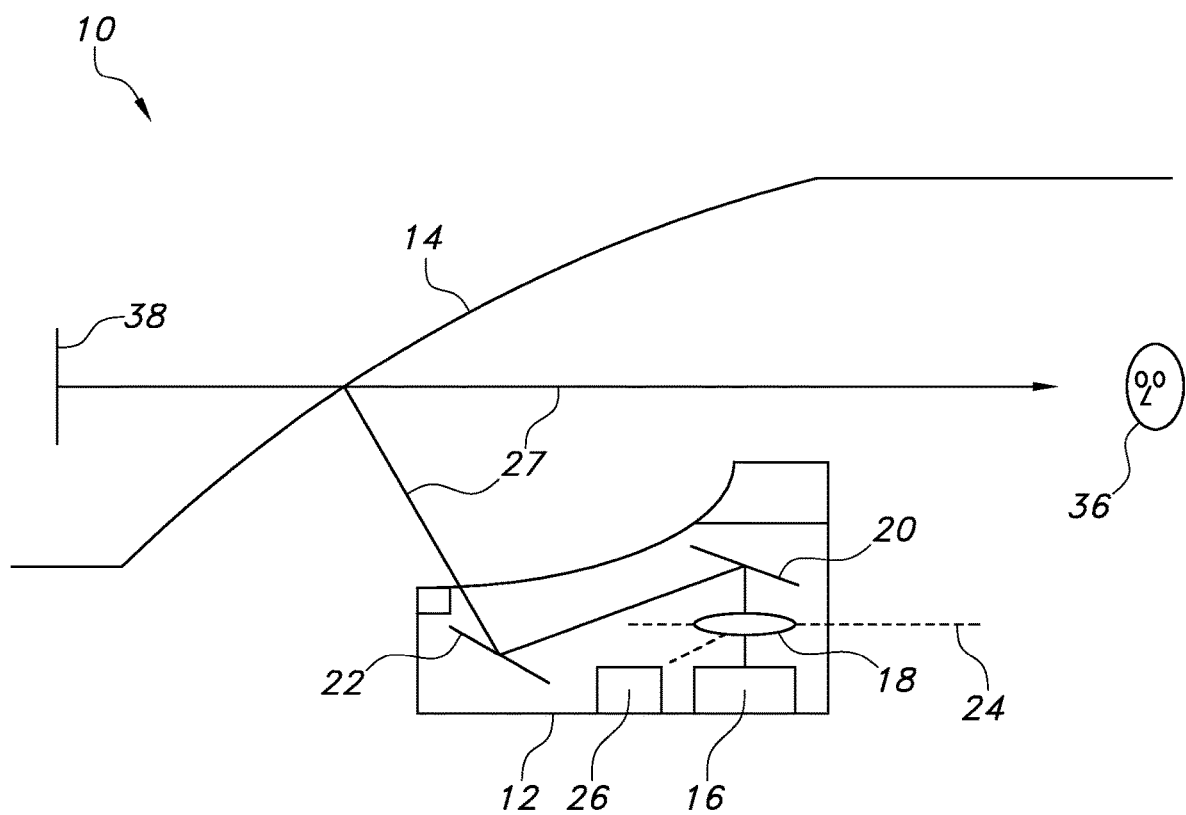
FIG. 1 is a schematic side view of one embodiment of an automotive head up display arrangement of the present invention.

FIG. 1 illustrates one embodiment of an automotive head up display arrangement 10 of the present invention, including a HUD module 12 and a windshield 14. HUD module 12 includes a. PGU 16, a rotatable polarizing device 18, a first mirror 20, and a second mirror 22. Polarizing device 18 may be rotatable within a span of 90 degrees about an axis 24 in order to provide more P-polarized light when rotated toward one end of the span, or less P-polarized light when rotated to the other, opposite end of the span. Polarizing device 18 may be in the form of a polarizer, a ¼ wave plate, or a ½ wave plate.

Polarizing device 18 may be rotated through its range of motion by a motor 26. It is also possible for motor 26 to be used as the HUD's stepper motor.

A light field 27 coming from PGU 16 may be generally polarized by polarizing device 18 all in either P- or S-polarization state. Most of the P-polarized light is lost at windshield 14, and the P-polarization state is the polarization state that is able to get through the polarized sunglasses. By using polarizing device 18 to provide a greater percentage of the energy in the P-polarized state, more brightness may be achieved at the eye in the P-polarized state.

Figure 2:
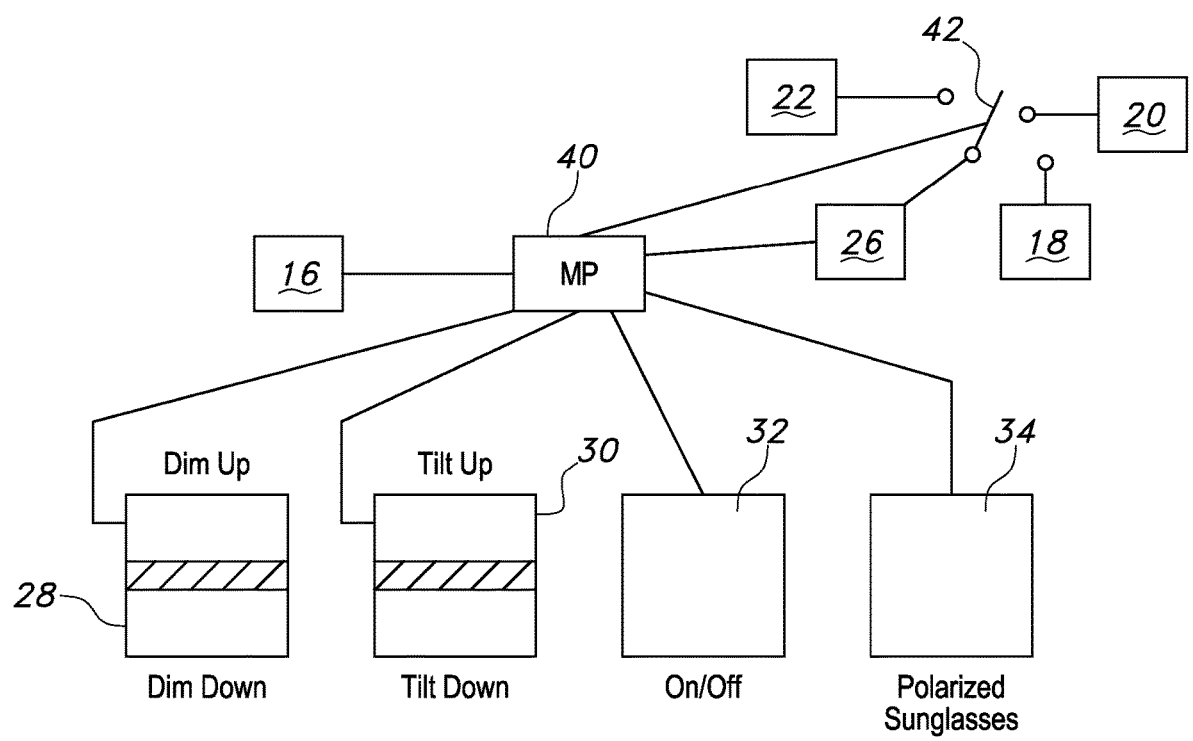
FIG. 2 is a plan view of one embodiment of a set of driver HUD controls of the present invention.

FIG. 2 illustrates one embodiment of a set of driver HUD controls of the present invention, which may be on a center console or dashboard of the motor vehicle, for example. The HUD controls include a brightness toggle switch 28, a vertical position toggle switch 30, an ON/OFF pushbutton 32, and a "polarized sunglasses" pushbutton 34. A microprocessor 40 is communicatively coupled to each of switches 28, 30, and to each of pushbuttons 32, 34. Microprocessor 40 may also be communicatively coupled to PGU 16, motor 26, and a mechanical switch 42. Switch 42 may selectively couple motor 26 to either polarizing device 18, first mirror 20, or second mirror 22. Microprocessor 40 may control the position of switch 42, and thus may control whether motor 26 can actuate polarizing device 18, first mirror 20, or second mirror 22. As mentioned above, motor 26 may be in the form of a stepper motor in one embodiment.

During use, light 27 from PGU 16 may be polarized by polarizing device 18, and reflected by mirrors 20, 22 and windshield 14 toward a user 36. Light 27 may appear to user 36 as a virtual image 38. If user 36 plans to wear polarized sunglasses, user 36 may select and depress polarized sunglasses pushbutton 34, which may cause polarizing device 18 to rotate and thereby allow more of the P-polarized light to be reflected from windshield 14 and reach the eyes of user 36. Accordingly, a virtual image 38 may be visible to user 36 even when wearing polarized sunglasses.

If user 36 manually moves toggle switch 28 to either brighten or dim down virtual image 38, switch 28 may transmit a signal to processor 40. Processor 40 may respond to this signal by causing PGU 16 to either produce a brighter or dimmer light field 27.

If user 36 manually depresses pushbutton 32 to either turn ON or turn OFF virtual image 38, pushbutton 32 may transmit a signal to processor 40. Processor 40 may respond to this signal by causing PGU 16 to either start producing light field 27 or cease producing light field 27.

If user 36 manually moves toggle switch 30 to either raise or lower virtual image 38, switch 30 may transmit a signal to processor 40. Processor 40 may respond to this signal by moving switch 42 to couple motor 26 to mirror 20 and/or mirror 22. Processor 40 may then cause motor 26 to move mirror 20 and/or mirror 22 to make virtual image 38 rise or fall, as desired by user 36.

If user 36 manually depresses pushbutton 34 when he puts on polarized sunglasses to switch pushbutton 34 to the "ON" state, pushbutton 34 may transmit a signal to processor 40. Pushbutton 34 may also light up to indicate that it is in an "ON" state to accommodate polarized sunglasses. Processor 40 may respond to the signal from pushbutton 34 by moving switch 42 to couple motor 26 to polarizing device 18. Processor 40 may then cause motor 26 to rotate polarizer 18 such that the amount of P-polarized light that reaches user 36 is increased. Conversely, if user 36 manually depresses pushbutton 34 when he takes off polarized sunglasses to switch pushbutton 34 to the "OFF" state, pushbutton 34 may transmit a signal to processor 40. Processor 40 may respond to the signal from pushbutton 34 by moving switch 42 to couple motor 26 to polarizer 18. Processor 40 may then cause motor 26 to rotate polarizing device 18 such that the amount of P-polarized light that reaches user 36 is decreased.

Figure 3:
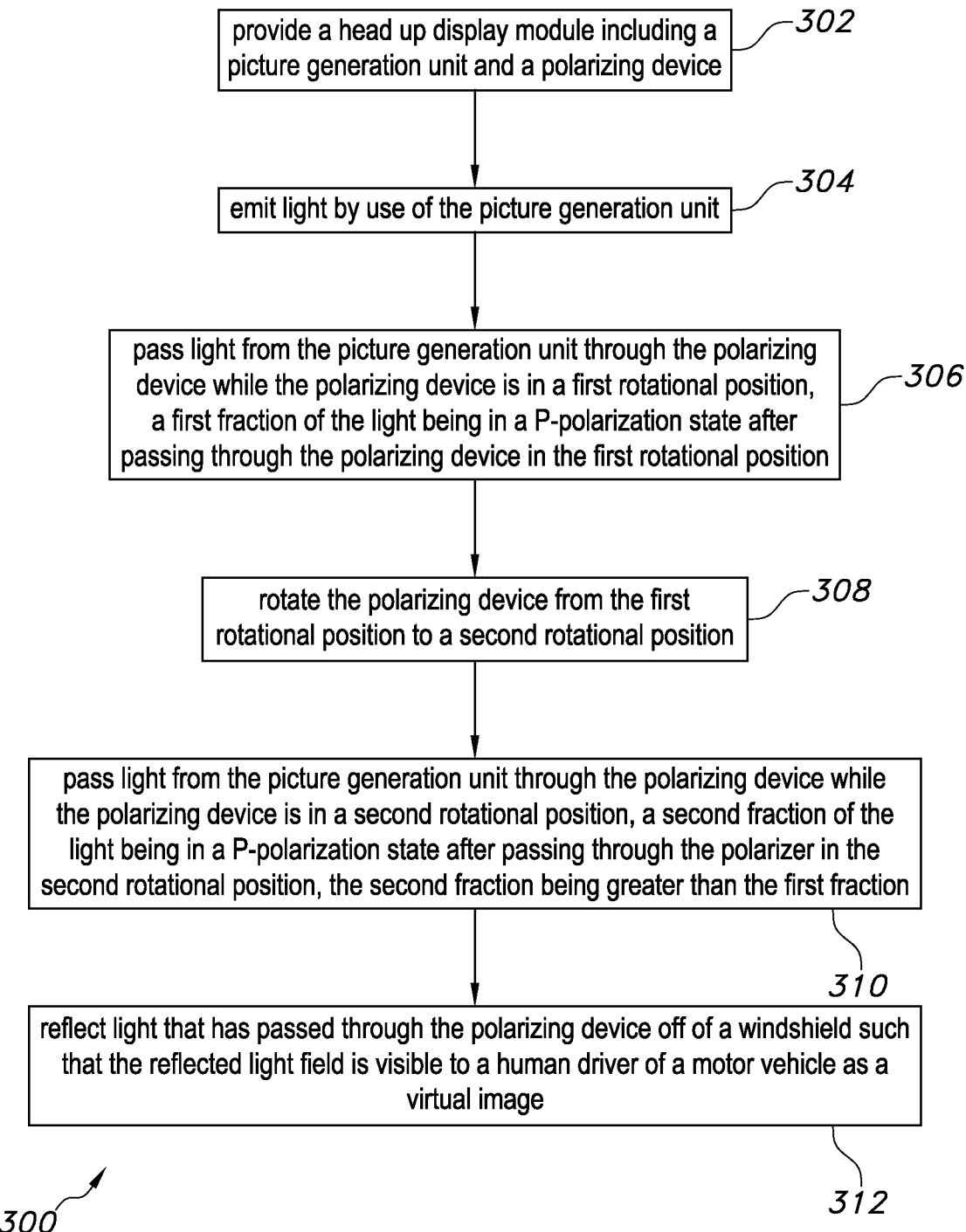
FIG. 3 is a flow chart of one embodiment of an automotive head up display method of the present invention.

FIG. 3 illustrates one embodiment of an automotive head up display method 300 of the present invention. In a first step 302, a head up display module including a picture generation unit and a polarizing device is provided. For example, HUD module 12 includes a PGU 16 and a rotatable polarizing device 18.

Next, in step 304, light is emitted by use of the picture generation unit. For example, light field 27 is emitted by PGU 16.

In a next step 306, light is passed from the picture generation unit through the polarizing device while the polarizing device is in a first rotational position. A first fraction of the light is in a P-polarization state after passing through the polarizing device in the first rotational position. For example, polarizer 18 may be in a first rotational position such that the amount of P-polarized light that reaches user 36 is relatively low.

In step 308, the polarizing device is rotated from the first rotational position to a second rotational position. For example, processor 40 may cause motor 26 to rotate polarizer 18 from the first rotational position to a second rotational position.

Next, in step 310, light is passed from the picture generation unit through the polarizing device while the polarizing device is in a second rotational position. A second fraction of the light is in a P-polarization state after passing through the polarizer in the second rotational position. The second fraction is greater than the first fraction. For example, while polarizer 18 is in the second rotational position, the amount of P-polarized light that reaches user 36 is relatively high, and greater than while polarizer 18 is in the first rotational position.

In a final step 312, light that has passed through the polarizing device is reflected off of a windshield such that the reflected light field is visible to a human driver of a motor vehicle as a virtual image. For example, light that has passed through polarizing device 18 may be reflected from windshield 14 such that the light appears to user 36 as a virtual image 38.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, comprising:
   a head up display module including:
      a picture generation unit configured to emit a light field; and
      a polarizing device that is rotatable between at least a first rotational position and a second rotational position, the polarizing device being configured to receive the light field from the picture generation unit and emit the light field regardless of whether the polarizing device is in the first rotational position or the second rotational position, more of the light being emitted by the polarizing device in a P-polarization state in the second rotational position than in the first rotational position; and
   a windshield configured to reflect the light field from the polarizing device such that the reflected light field is visible to a human driver of the motor vehicle as a virtual image.

2. The head up display arrangement of claim 1 wherein the first rotational position and the second rotational position are about 90 degrees apart.

3. The head up display arrangement of claim 1 wherein the polarizing device is rotatable about a substantially horizontal axis.

4. The head up display arrangement of claim 1 further comprising at least one mirror configured to reflect the light field from the polarizing device onto the windshield.

5. The head up display arrangement of claim 4 further comprising a motor configured to rotate the polarizing device between the first rotational position and the second rotational position.

6. The head up display arrangement of claim 5 wherein the motor is configured to change an orientation of the at least one mirror.

7. The head up display arrangement of claim 6 wherein the motor is configured to be selectively coupled to either the polarizing device or the at least one mirror and decoupled from the other one of the polarizing device and the at least one mirror.

8. A head up display module for a motor vehicle, comprising:
   a picture generation unit configured to emit a light field; and
   a polarizing device that is rotatable between at least a first rotational position and a second rotational position, the polarizing device being configured to receive the light field from the picture generation unit and emit the light field regardless of whether the polarizing device is in the first rotational position or the second rotational position, more of the light being emitted by the polarizing device in a P-polarization state in the second rotational position than in the first rotational position.

9. The head up display module of claim 8 wherein the first rotational position and the second rotational position are about 90 degrees apart.

10. The head up display module of claim 8 wherein the polarizing device is rotatable about a substantially horizontal axis.

11. The head up display module of claim 8 further comprising at least one mirror configured to reflect the light field from the polarizing device onto a windshield of the motor vehicle.

12. The head up display module of claim 11 further comprising a motor configured to rotate the polarizing device between the first rotational position and the second rotational position.

13. The head up display module of claim 12 wherein the motor is configured to change an orientation of the at least one mirror.

14. The head up display module of claim 13 wherein the motor is configured to be coupled to the at least one mirror.

15. An automotive head up display module, comprising:
    a picture generation unit configured to emit light;
    a polarizing device having a first rotational position and a second rotational position, the polarizing device being configured to:
       pass therethrough a first fraction of the emitted light that is in a P-polarization state while the polarizing device is in the first rotational position; and
       pass therethrough a second fraction of the emitted light that is in a P-polarization state while the polarizing device is in the second rotational position, the second fraction being greater than the first fraction.

16. The module of claim 15 wherein the polarizing device is rotatable about 90 degrees between the first rotational position and the second rotational position.

17. The module of claim 16 wherein the polarizing device is rotatable about a substantially horizontal axis between the first rotational position and the second rotational position.

18. The module of claim 15 further comprising at least one mirror configured to reflect the light passing through the polarizing device onto a windshield of a motor vehicle.

19. The module of claim 18 further comprising a motor configured to rotate the polarizing device between the first rotational position and the second rotational position.

20. The module of claim 19 wherein the motor is configured to change an orientation of the at least one mirror.

* * * * *